A. HERZ.
SHOCK ABSORBER.
APPLICATION FILED FEB. 20, 1909.
1,114,691.
Patented Oct. 20, 1914.
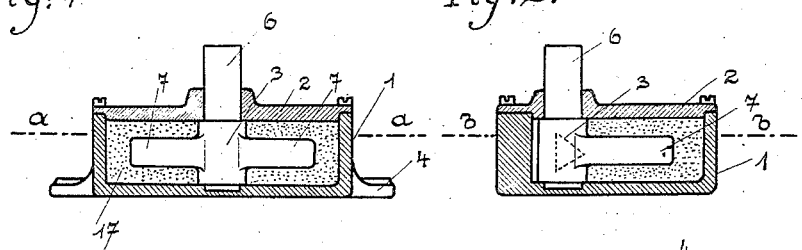
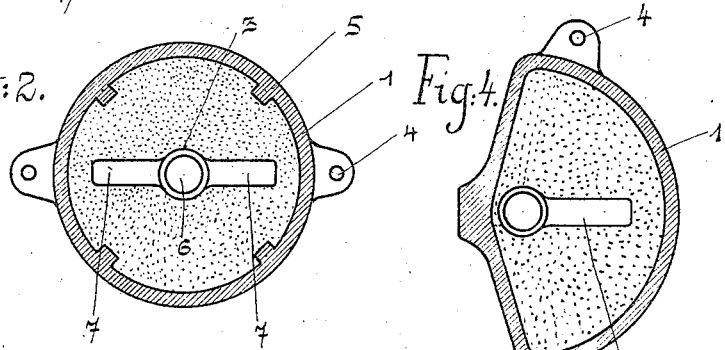
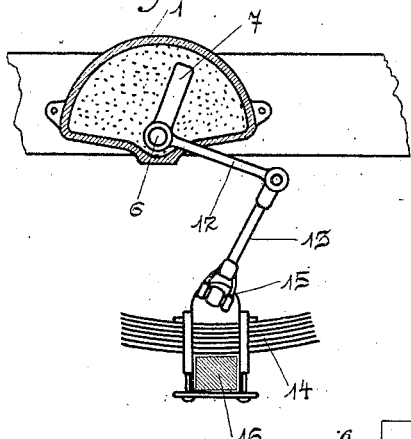
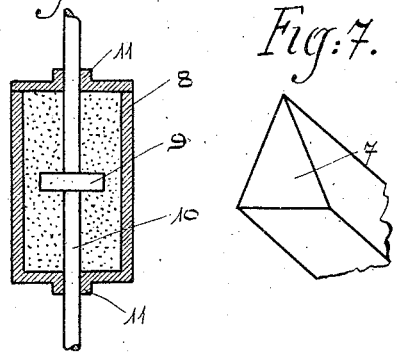
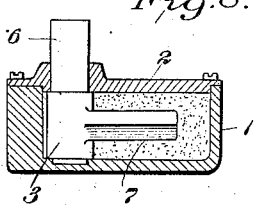
Inventor:
Adolf Herz

UNITED STATES PATENT OFFICE.

ADOLF HERZ, OF VIENNA, AUSTRIA-HUNGARY.

SHOCK-ABSORBER.

1,114,691. Specification of Letters Patent. Patented Oct. 20, 1914.

Application filed February 20, 1909. Serial No. 479,062.

*To all whom it may concern:*

Be it known that I, ADOLF HERZ, a subject of the Emperor of Austria-Hungary, residing at 8 Theobaldgasse, Vienna, VI, Austria-Hungary, have invented certain new and useful improvements in methods of and apparatus for checking or absorbing momentum and shocks, and particularly to that type of such apparatus in which arms or blades, connected to the member movement of which is to be checked, are adapted to move through a frictional mass contained in a suitable casing.

The object of the present invention is to provide means of the type referred to, which shall be simple of construction and more efficient in action than those hitherto employed for the same purpose.

Essentially, the invention resides in providing means by which the momentum of the body to be checked is absorbed by what may be termed a "kneading action" which is provided by causing the braking member to act in a mass, possessing great internal resistance, in a manner similar to the blades of a kneading machine.

In the accompanying drawings, Figure 1 is a transverse sectional view, through an apparatus constructed in accordance with the present invention; Fig. 2 is a horizontal sectional view on the line $a$—$a$ of Fig. 1; Fig. 3 is a view similar to Fig. 1, showing a slightly different form; Fig. 4 is a sectional view on the line $b$—$b$ of Fig. 3; Fig. 5 illustrates the application of the invention to a shock absorber for a vehicle; Fig. 6 is a sectional view of another form of apparatus embodying the invention; Fig. 7 is a detail view of a form of wing or abutment which may be employed; Fig. 8 is a view similar to Fig. 3, including a wing of the form shown in Fig. 7.

Referring to the drawings, and particularly to Figs. 1 and 2, 1 designates the inclosing casing or shell, and 2 the cover or removable wall thereof. A spindle or shaft 6 is mounted in bearings in opposite walls of the casing and projects at one end beyond the cover 2, so that it may be connected to any moving or movable body. Within the casing said shaft is provided with suitable radial projections 7 which are surrounded by the braking mass or body 17. The casing is adapted to be rigidly secured to any suitable body as by means of fastening devices extending through the lugs 4, and is preferably provided with suitable inwardly extending projections 5 which act to prevent bodily movement of the braking mass 17 within and relative to the surrounding wall of the casing.

The form of apparatus illustrated in Figs. 1 and 2 includes two wings or abutments 7 extending in opposite directions from the central spindle or shaft, but as shown in Figs. 3 and 4 the spindle may have a single wing or blade 7 projecting from a sleeve or collar 3 and the exterior casing can be of other than circular form. In both instances however, it will be seen that the parts are so proportioned and arranged that relatively large channels or spaces are provided between the outer ends of the abutments or blades connected with the spindle 6 and the surrounding casing and between the opposite (top and bottom, referring to Figs. 1 and 3) faces of said blades and the adjacent walls of the casing. Also in both forms bodily movement of the material 17 in the casing about the axis of the shaft or spindle 6 is prevented, and the checking of movement of the shaft is effected entirely by the internal resistance of the material 17 exerted on the wing or blade as it is forced through such material.

The members 7 may have the cross sectional form illustrated in Fig. 7, that is have one side face tapered or gradually reduced in thickness toward the free edge. A movable abutment or blade having the cross sectional form shown in Fig. 7 will present a relatively broad base-like face to the opposing resistance material when moving in one direction and a wedge-like face to such material when moving in the opposite direction, so that the resistance to movement of the blade will vary somewhat according to the direction of its movement. Such a construction is particularly adapted for use in controlling movements of a swinging body which it is desired should have a relatively free movement in one direction but be checked or have a retarded speed when moving in the opposite direction.

Fig. 5 illustrates the application of the invention to a shock absorber for a vehicle, the casing being fixed to the vehicle frame and the spindle 6 suitably connected with the axle so that, during relative vertical movement of the frame and axle, the spindle will be rocked or turned axially.

In Fig. 6 is illustrated a slightly different form of the invention, in that the member 10 which moves relative to the inclosing casing 8 is adapted to reciprocate instead of oscillate or rock, the braking effect being obtained by the resistance offered by the material 17 to an abutment 9 secured on said rod.

It will be evident that the invention may be applied to various uses other than the particular one illustrated. For example, the movable member can be connected with a door or similar swinging device and the apparatus will constitute an effective check, or it may be employed for checking the recoil of guns, etc.

The braking mass 17 may vary according to the use for which the apparatus is designed, and may be either a rigidly coherent or connected mass, such as lead, or a non-coherent or pulverulent mass, such as sand, sawdust, or a suitable plastic mass may be employed. Any thick "non-setting" paste may be used, a mixture of talc and soap having been found particularly effective. In every instance, however, this "braking mass" is of a non-fluid or dough like nature and the checking action is produced by the movement of the braking member therein as distinguished from forcing a fluid medium through a restricted passage or compressing a cushion-like body between the braking member and the walls of the casing.

It will be seen that an apparatus constructed in accordance with the invention is very simple, and will require little, if any, attention after its parts are assembled. Also, a uniform resistance to the moving body is presented, the amount of such resistance depending upon the form of the casing, character of filling material, etc.

A shock absorber constructed in accordance with this invention operates more satisfactorily and with greater efficiency than apparatus heretofore employed for the same purpose in which the braking or checking effect is produced by retarding the flow of liquid through, or from one side to the opposite side of, a wing or piston. In the various forms of apparatus heretofore employed, or proposed, for this purpose the resistance by which the undesired movement is checked has been provided by artificial means, such as causing a liquid to flow through relatively contracted ducts, ports, or channels or arranging a cushion between a braking member and the walls of a suitable casing or abutment. That is, such apparatus has employed or followed a radically different principle from that which is the basis of this invention. By the latter the checking resistance is not produced by any such artificial means, but in an inherent, natural, quality or characteristic of the material or substance employed. The employment of a substance of a highly viscous, or dense non-flowing, nature provides a shock absorber which has many practical advantages over such apparatus, operating according to a different principle as before noted, as have been heretofore used or proposed. For example it is manifestly of the greatest importance that the resistance offered by such an apparatus should be constantly uniform. That is, the condition of the braking or resisting material should not vary from time to time. The lack of this quality constitutes one of the great objections to the shock absorbers in which a body of liquid or fluid is employed. Even if a relatively heavy oil is employed the heating effect produced by a slight use of the apparatus is sufficient to reduce the density of the liquid so that it will flow more freely, and thus reduce the resisting power thereof. Again the very slightest amount of wear, which necessarily results from a use of such an apparatus for a short time, by which the size of the fluid passage is increased results in a material reduction in the amount of resistance afforded by the device. Another great objection to apparatus of the type referred to is that it is impossible to prevent the liquid from escaping from the casing, about the joints between the members, or from being affected by the atmosphere. For instance evaporation or changes in temperature will cause such variation in the quantity and condition of the liquid as to necessitate frequent attention and change to maintain the apparatus in approximately normal condition. These and other objections have prevented the practical employment of such shock absorbing apparatus to any extent.

By employing such a shock absorbing or resisting material as is herein described, the apparatus is free from both the objections above noted. The resisting power thereof is not varied by use, nor is there any danger of loss of such material by the action of the atmosphere, leakage, etc. The particular material employed for the braking mass will necessarily depend upon the size or capacity of the apparatus and the use for which it is intended. Such mass in an apparatus of large size and designed to check powerful shocks will necessarily be different from that which is used in rotatively small devices and required to possess comparatively little resistance. In all cases, however, as hereinbefore noted, such braking material is of a character possessing a constant, high natural internal resistance which is not affected by changes in temperature or by length of use. For this reason oil, or even thick fluid substances can not be employed.

If the apparatus is to be of relatively high power and to check powerful blows solid material, such as lead, sand, shot, &c., may be employed whereas for lighter use a thick "non setting" paste is used. In every case however the braking material is non-fluid in form and possesses characteristics, which have been set forth herein, clearly distinguishing it from the fluid substances previously employed or proposed.

Having thus described the invention, what is claimed as new and desired to secure by Letters-Patent is,

1. The hereindescribed method of checking or absorbing momentum and shocks consisting in causing relative movement between a braking member and a non-fluid mass held against bodily movement with said member and of such character that the momentum is checked by the natural high internal resistance of said material acting upon the braking member in contradistinction to employing means controlling movement of material under the action of the braking member.

2. In a shock absorber, the combination with a relatively movable casing and spindle, of a braking member within the casing and connected with the spindle, said member being separated at all points from the adjacent walls of the casing by relatively wide spaces, and a non-fluid mass filling the casing and held from bodily movement therein, whereby relative movement of the spindle and casing will be checked by the natural internal resistance of said mass acting on the braking member.

3. In a shock absorber, the combination with a relatively movable casing and spindle, the latter extending into a segmentally shaped chamber within the casing, of a wing-like braking member projecting radially from the spindle within the casing, said parts being so proportioned that an unobstructed space is provided between the casing and the braking member and spindle except at the bearings of the latter in the casing, and a body of non-fluid material filling the casing and adapted to check relative movement of the casing and spindle by the action of its natural internal resistance on the wing-like member.

4. In a shock absorber for resisting relative movement between two members of a vehicle, the combination of a casing adapted to be connected to one of said members, a mass of non-fluid, dough-like material, within the casing, and held from bodily movement therein, and a braking member embedded in said mass and adapted to be connected with the other of said vehicle member, substantially as and for the purpose described.

5. In a shock absorber, the combination of a casing, a wing-like member therein, said parts being relatively movable, and a body of yielding material filling the spaces between the walls of the casing and said wing, a portion of the latter being wedge-shape in cross section, whereby the device is adapted to exert a greater momentum-checking effect when the movable member thereof is moving in one direction than when moving in the opposite direction.

6. In a shock absorber, the combination of a casing, a member movable therein and having its body reduced in thickness toward one limit of its path of movement, and a body of material of the character described filling the spaces between said member and the casing, the cross-sectional form of said movable member causing it to be subjected to greater resistance when moving in one direction than when moving in the opposite direction.

In testimony, that I claim the foregoing as my invention, I have signed my name in presence of two witnesses, this 30th day of January, 1909.

ADOLF HERZ.

Witnesses:
  LEOPOLD ROSENBAUM,
  ROBERT W. HEINGARTNER.